(12) United States Patent
Maia et al.

(10) Patent No.: US 12,524,531 B2
(45) Date of Patent: Jan. 13, 2026

(54) CONTINUAL LEARNING APPROACH FOR THREAT DETECTION IN ZERO-TRUST ARCHITECTURES

(71) Applicant: Dell Products L.P., Round Rock, TX (US)

(72) Inventors: Isabella Costa Maia, São Paulo (BR); Karen Stefany Martins, Belo Horizonte (BR); Pablo Nascimento da Silva, Niterói (BR); Werner Spolidoro Freund, Rio de Janeiro (BR)

(73) Assignee: Dell Products L.P., Round Rock, TX (US)

( * ) Notice: Subject to any disclaimer, the term of this patent is extended or adjusted under 35 U.S.C. 154(b) by 435 days.

(21) Appl. No.: 18/159,766

(22) Filed: Jan. 26, 2023

(65) Prior Publication Data

US 2024/0256656 A1    Aug. 1, 2024

(51) Int. Cl.
*G06F 21/55* (2013.01)
*G06F 21/56* (2013.01)

(52) U.S. Cl.
CPC .......... *G06F 21/554* (2013.01); *G06F 21/552* (2013.01); *G06F 21/564* (2013.01)

(58) Field of Classification Search
None
See application file for complete search history.

(56) References Cited

U.S. PATENT DOCUMENTS

| | | | |
|---|---|---|---|
| 9,292,688 B2 * | 3/2016 | Avasarala | G06F 21/56 |
| 9,465,939 B2 * | 10/2016 | Alme | G06F 21/564 |
| 9,665,713 B2 * | 5/2017 | Avasarala | G06F 21/566 |
| 10,157,279 B2 * | 12/2018 | Davis | G06F 21/565 |
| 10,305,923 B2 * | 5/2019 | McLane | G06N 20/00 |
| 10,372,913 B2 * | 8/2019 | Harms | G06F 21/568 |
| 10,860,720 B2 * | 12/2020 | Hartnett | G06F 21/568 |
| 11,003,773 B1 * | 5/2021 | Fang | G06N 20/00 |
| 11,714,905 B2 * | 8/2023 | Ducau | G06N 3/045 |
| | | | 726/24 |
| 11,836,664 B2 * | 12/2023 | Ackerman | G06N 7/00 |
| 11,977,633 B2 * | 5/2024 | Ulasen | G06F 21/562 |
| 12,174,956 B2 * | 12/2024 | Ma | G06F 21/566 |
| 2021/0241175 A1 * | 8/2021 | Harang | G06F 18/2178 |
| 2022/0237285 A1 * | 7/2022 | Arnon | G06F 21/554 |
| 2022/0245249 A1 * | 8/2022 | Hewlett, II | G06F 21/566 |

(Continued)

OTHER PUBLICATIONS

S. Rose, "Planning for a Zero Trust Architecture: A Planning Guide for Federal Administrators," in NIST, 2022.

(Continued)

*Primary Examiner* — Backhean Tiv

(74) *Attorney, Agent, or Firm* — Workman Nydegger

(57) ABSTRACT

Threat detection in computing architectures is disclosed. A model is trained to classify files. The files may each be classified as safe or as a threat. Files that are not classified as safe with a sufficient confidence level and may represent a new threat are forwarded for further analysis at a central server and/or with expert input. If the new threat is verified, the model is adapted such that the model can recognize the new threat without forgetting the threats previously learned. The adapted or updated model is deployed to the endpoint and the current version of the model is replaced with the updated model.

20 Claims, 7 Drawing Sheets

(56) References Cited

U.S. PATENT DOCUMENTS

2024/0256656 A1* 8/2024 Maia .................... G06F 21/552
2024/0289436 A1* 8/2024 Burns ................ H04L 63/1433

OTHER PUBLICATIONS

M. De Lange, R. Aljundi, M. Masana, S. Parisot, X. Jia, A. Leonardis, G. Slabaugh and T. Tuytelaars, "A continual learning survey: Defying forgetting in classification tasks," IEEE transactions on pattern analysis and machine intelligence, vol. 7, No. 44, pp. 3366-3385, 2021.

* cited by examiner

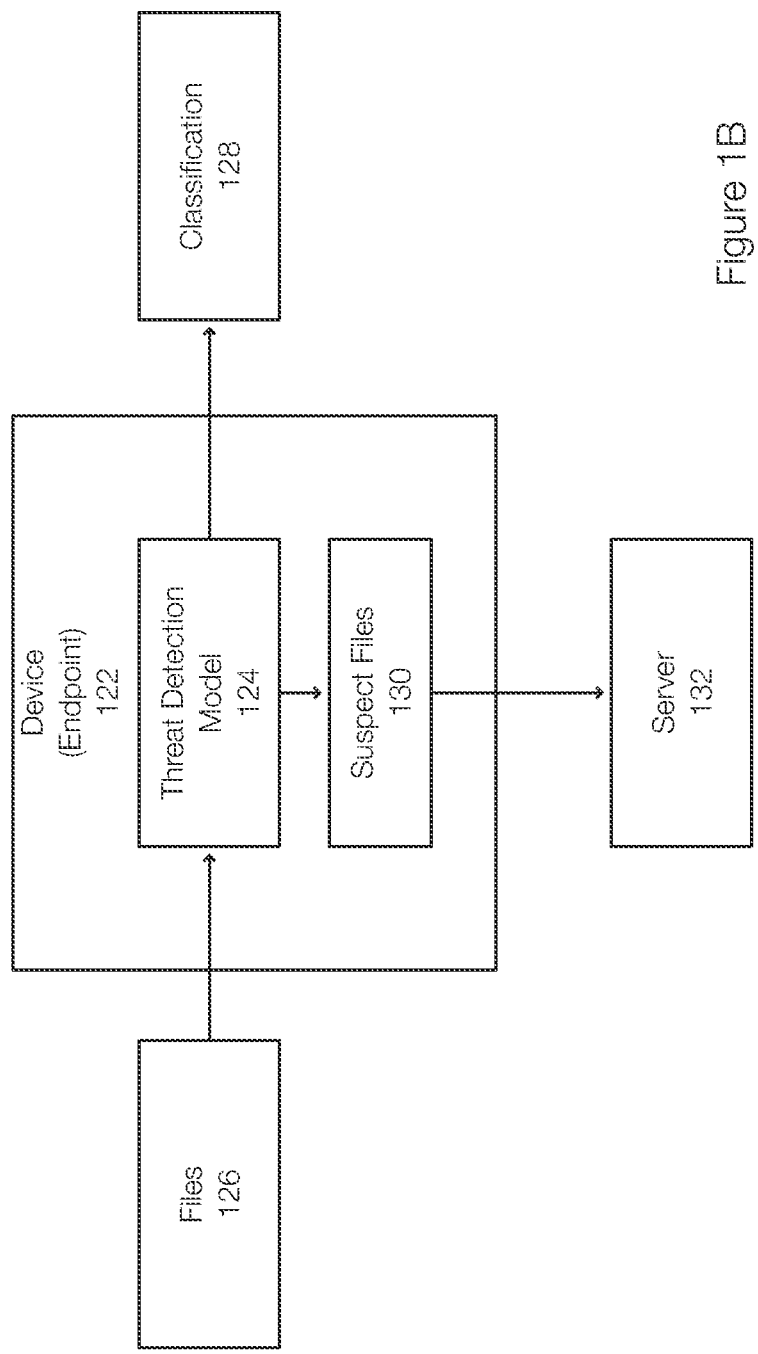

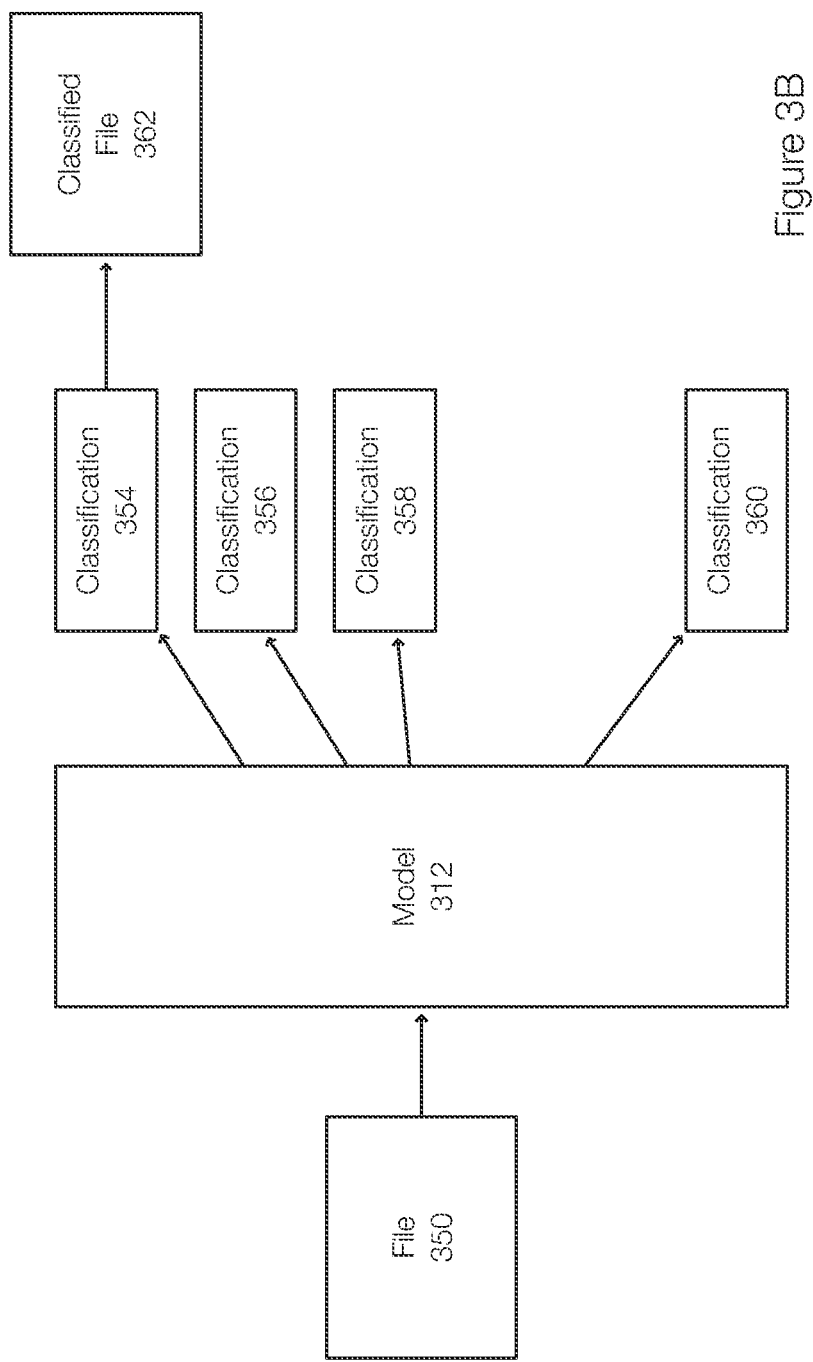

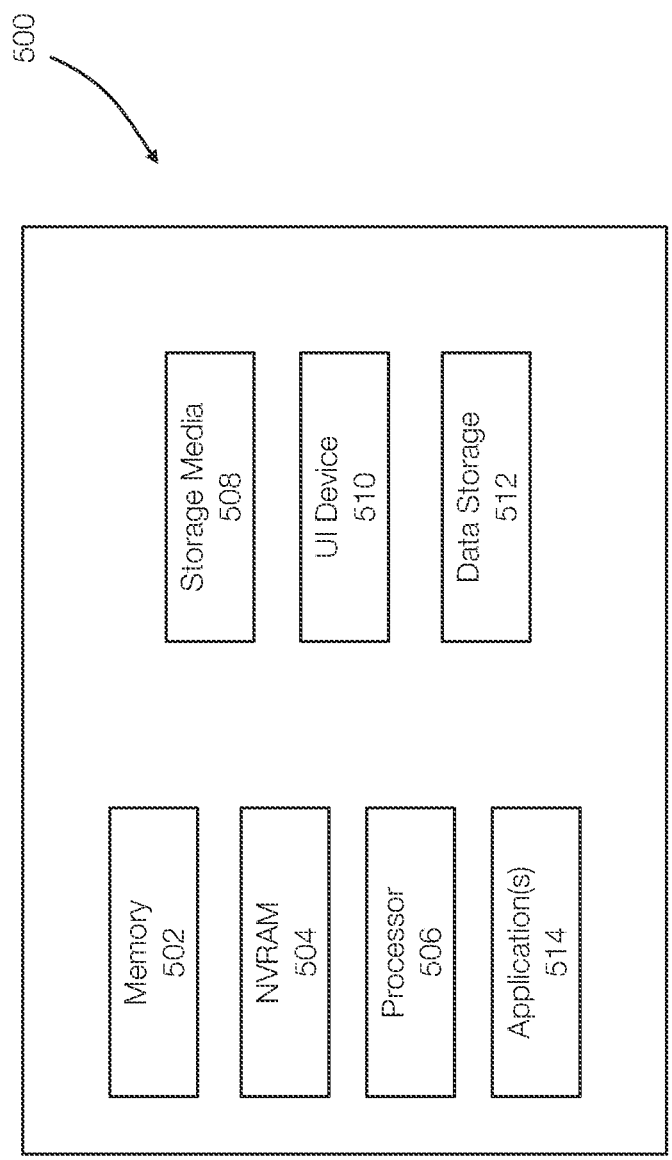

CONTINUAL LEARNING APPROACH FOR THREAT DETECTION IN ZERO-TRUST ARCHITECTURES

FIELD OF THE INVENTION

Embodiments of the present invention generally relate to security paradigms including zero-trust architectures and frameworks. More particularly, at least some embodiments of the invention relate to systems, hardware, software, computer-readable media, and methods for continual threat detection in computing systems.

BACKGROUND

Zero-trust systems are based on a never trust, always verify paradigm. In other words, zero-trust systems should be capable of verifying all files, users, and activities inside a network and its participating devices. A zero-trust system should be capable of identifying threats, providing warnings, and updating access policies automatically.

Unfortunately, there are many different threats to a system and the ability to detect and respond to existing and unknown or new threats is a challenging task. The challenge is significant, in part, because threats in a dynamic computing environment typically increase over time. Further, detecting a known threat is distinct from detecting a new or unknown threat.

Conventionally, threats are identified by creating a machine learning model for each threat. This naturally requires a new model to be developed for each new threat. The approach of training a different model for each threat is not feasible in many environments, due in part to storage constraints, manageability, and orchestration. For example, as the number of models grows, there is a corresponding increase in resource usage and cost. Plus, the need to update models can result in catastrophic forgetting, which could remove the ability to detect known threats.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which:

FIG. 1B discloses aspects of a zero-trust security system that includes endpoint threat detection;

FIG. 3B discloses aspects of classifying data such as files;

FIG. 5 discloses aspects of a computing device, system, or entity.

DETAILED DESCRIPTION OF SOME EXAMPLE EMBODIMENTS

Figure 1A:
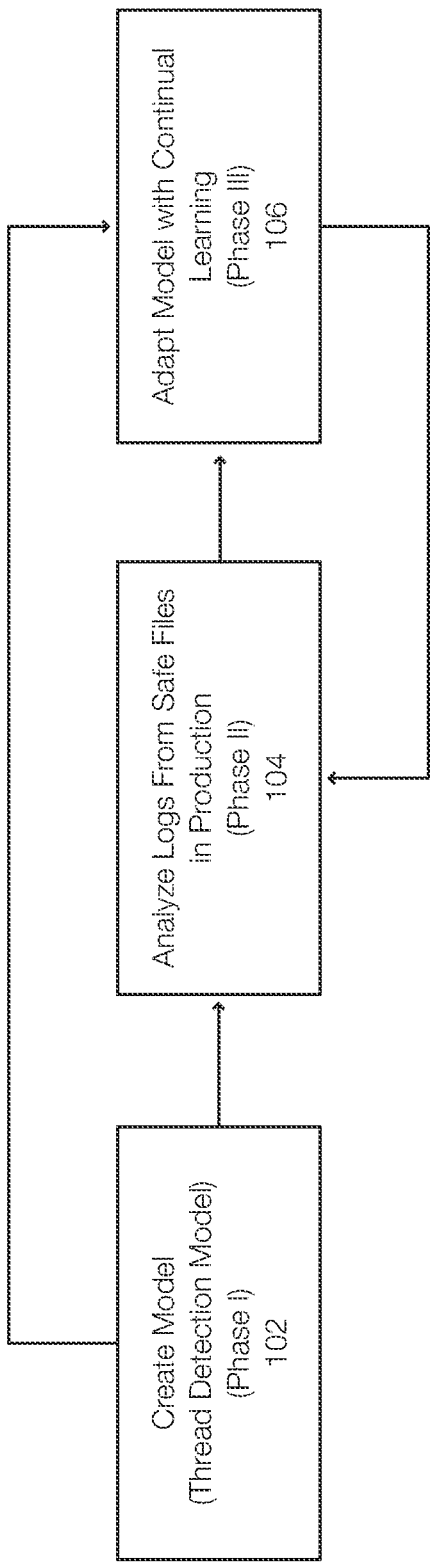
FIG. 1A discloses aspects of a mechanism for continually training machine learning models, such as threat detection models.

Embodiments of the present invention generally relate to security in computing systems and to threat detection in computing system. More particularly, at least some embodiments of the invention relate to systems, hardware, software, computer-readable media, and methods for a continual learning approach for threat detection in computing securing systems including zero-trust paradigms.

Although embodiments of the invention are discussed in the context of zero-trust systems, embodiments of the invention may be implemented in other computing and security paradigms and systems.

Embodiments of the invention relate to a machine learning model that is configured to detect threats in a computing system and that can be adapted over time to predict or detect new threats without forgetting how to detect existing threats and without storing/transmitting large chunks of data (e.g., training data). Embodiments of the invention provide a continual learning approach to improve the processing, storage, and statistical efficiency in a zero-trust framework. Embodiments of the invention may train a single model, such as a threat detection model, that is capable of performing/learning multiple tasks. The tasks include learning to detect threats and/or detecting threats. As new tasks are learned, previously learned tasks are not forgotten. Thus, the threat detection model can continually be adapted and be configured to detect multiple types of threats. The threat detection model may also be capable of using previous knowledge to improve the prediction of new threats. Further, the ability to detect new or previously unknown threats may also improve the model's accuracy in identifying or detecting previous threats.

Zero-trust includes, in one example, a set of principles upon which technology architectures are planned, deployed, and operated. Zero-trust may use a holistic view that considers potential risks and how the risks can be mitigated. Even if there is no specific or standard zero-trust implementation, one aspect of zero-trust implementations is to ensure that network workflows are being analyzed at every step. Embodiments of the invention relate to an endpoint detection and response system (e.g., a threat detection model) within the dynamic control plane of zero-trust security architectures. Embodiment of the invention, however, are not limited to zero-trust security architectures.

Embodiments of the invention include a continual learning aspect that allows new tasks to be learned continually and adaptively. An example of a task is learning to detect or classify a new threat. Advantageously, knowledge can be added to the threat detection model without sacrificing previously acquired knowledge. Unlike traditional zero-trust architectures that focus on solving a single task at a time (e.g., a new model for each new task/threat), continual learning allows for training a single model to perform many tasks (detect multiple threats). Embodiments of the invention, compared to traditional systems that use a model for each threat, use less computational power and model storage. Continual learning deals with the stability-plasticity dilemma, which focuses on accumulating knowledge (plasticity) without catastrophically forgetting prior knowledge (stability).

A single model capable of performing multiple tasks takes advantage of learned concepts such as forward and backward knowledge transfer. The knowledge acquired earlier is used in the new tasks, and learning new tasks improves the performance with respect to previously learned tasks. This advantageously avoids the need to restart the training process from the beginning and leads to better generalization in the treat detection model.

Generally, continual learning is divided in three scenarios: domain, task and class incremental learning. In domain incremental learning, tasks have the same classes, but input distributions are different. In task incremental learning, the model is informed about which task needs to be performed. This allows for models with task-specific components. In class-incremental learning, models are able to both solve each task seen so far and infer which task is being presented. All three scenarios assume that task boundaries are known during training, which can be a disadvantage when task identity is not available. Task agnostic continual learning focuses on this hard scenario where the task boundaries are unknown during training.

Embodiments of the invention are discussed in the context of class-incremental learning, where data arrives sequentially in batches and each batch may contain data from at least one specific threat. During training, only the current threat data needs to be accessed. Embodiments of the invention are configured to maintain the accuracy of the model with regard to previously seen threats as the model learns new threats.

FIG. 1A discloses aspects of continually learning in the context of training machine learning models to be capable of detecting or predicting previously learned threats and new threats. A threat detection model, which is an example of or which includes a machine learning model, may be deployed in endpoint detection scenarios by way of example.

FIG. 1A illustrates example phases or stages related to detecting, inferring, or predicting threats. The first phase is to create 102 a model such as a threat detection model. In one example, the model may be a deep neural network model (DNN) that is configured to classify input, such as files, to the model. The model may classify the input. For example, an input file may be classified as safe or as a threat. In one example, the model may be trained to recognize or detect various types of threats by generating a classification for an input. Each type of threat corresponds to a classification. Safe is also a classification. Thus, the model may classify a file as safe or as a threat of a particular type.

In a second phase, the model has been deployed to a production system and be implemented in an endpoint. The second phase may include collecting files that are marked as potential threats for further analysis. In one example, data and/or metadata (files and/or file metadata) that has been classified as a potential threat may be analyzed 104 during the second phase. In one example, a file is marked as a potential threat or as a suspect file when the threat detection model does not have sufficient confidence that the file is safe. For example, a suspect file may not be classified as a threat. At the same time, the probability or inference that the file is safe is below a threshold value. In this example, the file is marked as a potential threat or as a suspect file.

In the third phase, the model is adapted 106 using continual learning. Adapting the threat detection model evaluating the suspect files or validating that the suspect files actually constitute a threat. If the suspect files are validated, the task of adapting the model to recognize the new threat is performed. This task is performed without causing the model to forget previously learned tasks. The model is adapted such that new threats can be detected and, in one example, while increasing the performance of the model with regard to detecting previously learned threats. This is an example of active backward knowledge transfer.

FIG. 1B discloses aspects of a zero-trust security system that includes endpoint threat detection. More specifically, FIG. 1B illustrates a device 122, which is an example of an endpoint. The device 122 may alternatively represent an endpoint system or environment that includes multiple devices. The device 122 may be a computer, a laptop, a tablet or other device. The device 122 is a device that may connect to and exchange information with a computing network. In a zero-trust system, which may include a threat detection model 124, is configured to verify all users, files, and activities with respect to devices in a network and inside the network. The threat detection model 124 is illustrated in the context of verifying data received by the device 122. The data may include or be generally represented by the files 126. The files 126 may be received from within a local network or from an external source over a network or in another manner.

The threat detection model 124 may be configured to classify each of the files 126 received by the device 122. The threat detection model 124 generates or infers a classification 128 for each of the files. The files that are identified or inferred as safe with low confidence (e.g., a probability of being classified as safe is less than a threshold probability or value) are examples of suspect files 130. The suspect files 130 may be transmitted or provided to a server 132 for further analysis to verify that a threat is present or not present. The results of the analysis may be used in continual learning to further adapt the threat detection model 124 to detect threats represented by or included in the suspect files 130.

First Phase

Figure 2:
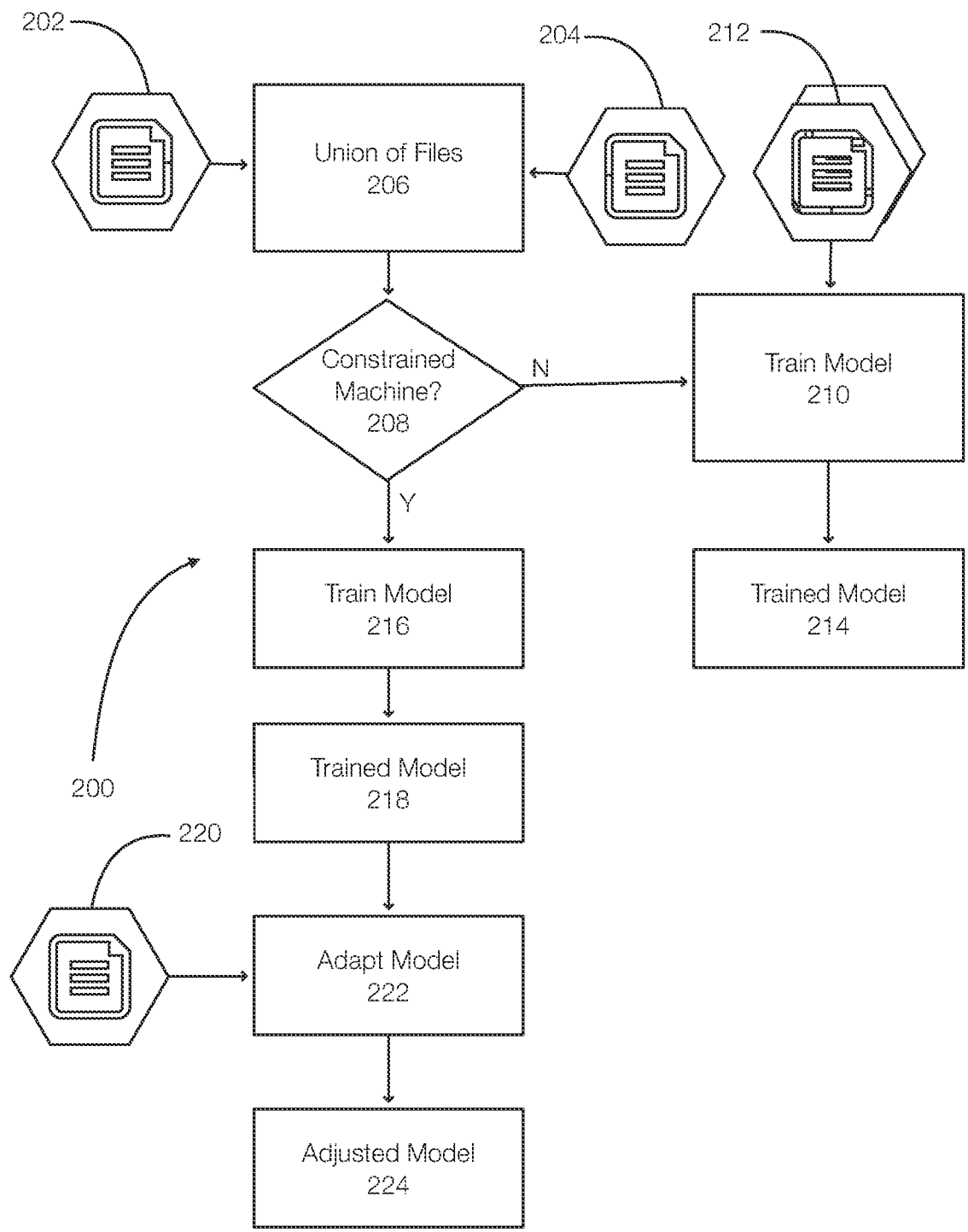
FIG. 2 discloses aspects of training a threat detection model.

FIG. 2 discloses aspects of a first phase of threat detection in which a model such as a threat detection model is trained. The threat detection model can be trained in different manners that may depend on whether a training environment is resource constrained.

In one example, training a threat detection model may begin with two datasets ($D_1$ and $D_2$) 202 and 204. The datasets 202 and 204 represent two classes of data (files) ($C_1$ and $C_2$). The dataset 202 may represent a first class ($C_1$) of safe files and the dataset 204 may represent a second class ($C_2$) of files having a threat type A. Thus, the dataset 202 ($D_1$) includes a collection of files that are safe or that have no intrinsic threat. The dataset 204 ($D_2$) includes a collection of files of threat type A.

Using these two datasets 202 and 204, a union ($D_u$) 204 of files is generated and, if the machine or training environment is constrained (Y at 208), the threat detection model (or other model) is trained 216 to perform the prediction of classes $C_1$ and $C_2$ using $D_u = D_1 \cup D_2$. This results in a trained model 218 that is able to predict or infer whether a file is safe or of type A.

The model may be adapted 222 to learn additional classes of files 220, which are examples of other threat types. Adapting 222 the model may include aspects of continual learning. The files 220 may be a dataset or a collection of datasets that includes known threat types. If a collection of known threats represented by datasets $D = \{D_3, D_4, \ldots, D_N\}$, where $|D| = N-2$ and N is the number of classes, the initial threat detection model is trained using all available datasets that represent known threats. This results, using continual learning, in the adjusted model 224 that can output N classifications, which include a safe classification and N−1 threat classifications.

If the resources for training are not constrained (N at 208), the model may trained 210 using all available dataset 212, which include datasets that allow the model to be trained to recognize or detect known threats. This results in the trained model 214 that can detect N classifications. Regardless of the manner in which the threat detection model is trained (e.g., using continual learning at 222 when resources are constrained or training with multiple known datasets when resources are not constrained), the trained model 214 and the adapted model may both be trained more when, during production, additional threats are detected or potentially detected using continual learning.

Second Phase

After the threat detection model is trained, the threat detection model may be deployed to an endpoint system that is responsible for identifying or detecting threats. The model may operate in the context of a zero-trust systems. When the threat detection model detects or predicts a safe file, data from the file, data from similar files, data from associated logs and metadata may be collected. The metadata may include information about usage, size, users, polices, or the like. More generally, data from every file classified by the threat detection model may be collected for various reasons including further analysis, further training, or the like. In some embodiments, however, data is collected for data or files that are not classified with sufficient confidence.

For example, a file that is classified as safe but with insufficient confidence may be collected, stored, and used for continual learning purposes. In another example, a file that is classified as a threat but with insufficient confidence may also be collected stored and used for continual learning purposes. In the first example, further analysis may determine that the file is indeed safe or that a new threat has been identified. In the second example, the file may be confirmed as being a specific type or a new type may be detected. Both examples can be used to improve the classification performed by the threat detection model.

In one example, the classification generated by the threat detection module may be a probability. Thus, the output may be a probability that a particular file is safe (e.g., 95% safe, 5% type A threat). A threshold value may be established such that information or data for files whose classification is above the threshold value for safe files is not collected. Thus, data and information may only be collected for files where the model is unsure about the file's classification. In other words, if the model indicates sufficient confidence that a file is safe, no data may be collected (collecting data, however, is not precluded). If the model has insufficient confidence in the file's classification, data is collected.

The data collected in this manner may be transmitted to a central server and a threat analysis may be performed on the collected data. The analysis may include automated tests and/or input from specialists. If a threat is identified, a dataset may be constructed that includes the files associated with the new threat. The size of this new dataset may be defined by a data minimum size variable for each task ($d_{min,N+1}$). This new dataset ($D_{N+1}$) may be used to adapt the model using a continual learning procedure (third phase).

Figure 3A:
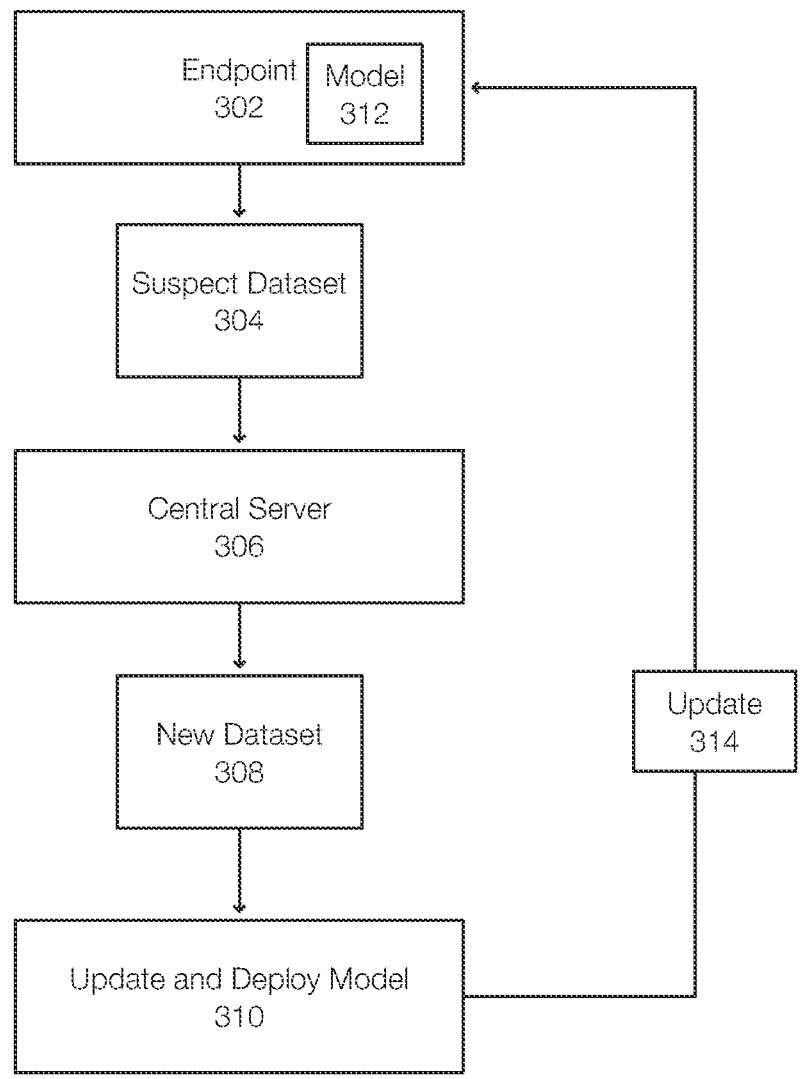
FIG. 3A discloses aspects of operating the threat detection model.

FIG. 3A discloses aspects of operating a threat detection model. FIG. 3A illustrates a threat detection model 312 that has been trained and deployed to an endpoint 302. During operation, the model 312 may classify files.

FIG. 3B discloses aspects of classifying data such as files performed at the endpoint 302. The model 312 may have been trained, for example during the first phase illustrated in FIG. 2, to detect threats by generating a classification for each input file or other data. In this example, the model 312 is trained to detect N types of threats. The classifications may include classifications ($C_1, \ldots, C_N$), which are represented by the classifications 354, 356, 358, and 360. In this example, the classification 354 is safe and the others are different threat types (types A, B, . . . Z).

The output of the model 312 may include a classification. The classification may be presented as a probability. For example, the model 312 may generate an output for the file 350 that includes a probability for each of the classifications learned by the model 312. The output of the model 312 is represented as the classifications 354, 356, 358, and 360. Once the classifications are generated, the input file 350 becomes a classified file 362. In this example, the classified file 362, based on the classifications for the file 350 generated by the model 312, may indicate that the classified file 362 has an 80% probability of the classification 354. The other classifications 356, 358, and 360 may have lower probabilities. The probability value associated with the dominant or primary classification, which is the classification 354 in this example, may be compared to a threshold value. Files whose classification values are below the threshold value may be identified as suspect files that are subject to further analysis. Stated differently, when the classification 354 is lower than a threshold value, the model 312 has low confidence that the classified file 362 is of the classification 354.

Returning to FIG. 3A, the model 312 may generate classifications for files at the endpoint 302. In one example, a file may be assigned the classification 354 (safe). However, the probability that the file is of the classification 354 may be below a threshold value or probability. In this example, the file may be added to or included in a suspect dataset 304 when the value (e.g., the classification probability or output of the model 312 in the relevant classification) is below the threshold value. The suspect dataset 304 thus includes files and other information/metadata that do not have a classification value above a threshold value for the safe classification and are not classified as a threat type by the model 312.

The suspect dataset 304 is transmitted to a central server 306. The central server 306 may perform threat verification analysis on the files in the suspect dataset 304. The analysis may include automated analysis. The analysis may also include expert input. If a new threat is determined by the analysis, a new dataset 308 that corresponds to a new threat type may be produced. As the model had previously learned N types, the new dataset 308 may correspond to a dataset $D_{N+1}$ of a new type and a new classification. The new dataset may be used to update and deploy 310 model such that the model 312 can detect N+1 classes. Thus, the model 312 is updated or replaced with an updated model or with an update 314. The model 312 is updated using continual learning such that the model 312 learns to detect the new threat represented by the new dataset 308 without forgetting the ability to identify previous types of threats that were previously learned.

Figure 4:
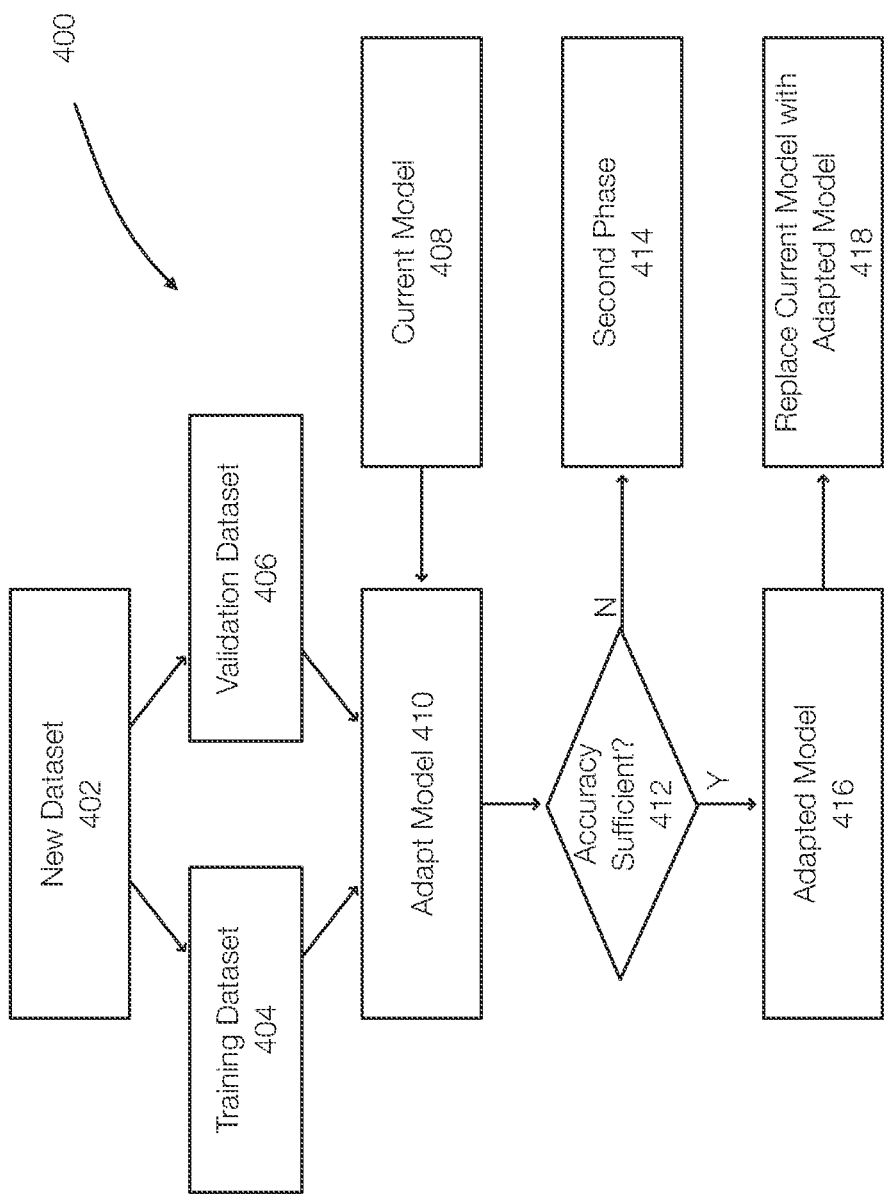
FIG. 4 discloses aspects of updating the threat detection model.

FIG. 4 discloses aspects of updating the threat detection model. In the method 400, a new dataset 402 may be generated by the central server from the suspect dataset. The new dataset 402 may be or include the suspect dataset received from the endpoint. In this example, the new dataset 402 is divided into a training dataset 404 and a validation dataset 406. The validation dataset 406 is not used for training purposes. The model 410 is then adapted 410 using the training dataset 404. Once the new learning task is completed and the model is adapted 410, the adapted model is validated with the validation dataset 406.

If the accuracy of the model is sufficient (Y as 412), the model is considered to be ready for deployment and the current model at the endpoint is replaced 418 with the adapted model 416. In one example, the model is sufficiently accurate if an acceptance threshold is 0.9 or greater. In other words, the accuracy is sufficient when the accuracy of identifying the new threat (e.g., using the validation dataset 406) is 90% or more. If the accuracy of the adapted model is not sufficient (N at 412), the method 400 returns to the second phase to collect more data for the new dataset 402. Once additional data is collected, the method 400 may be repeated. In this case, however, the new dataset 402 includes more data/files.

Adapting 410 the model may include performing a continual learning method configured for class-incremental learning, such as elastic weight consolidation (EWC), learning without Forgetting (LwF), or the like.

In a cybersecurity environment, new types of threats are frequently discovered. As previously stated, an approach of using a model per threat is difficult to scale due to requiring multiple models and the associated high processing and storage requirements. Embodiments of the invention relates to updating a single model to learn new tasks (detect new threat types) without forgetting previously learned tasks. Further, there is no need for the model to learn all known tasks initially and no need to retrain the model from the beginning each time a new threat is discovered. Rather, the model can be trained with as many threats as are known and may be updated or adapted as new threats are discovered. Embodiments of the invention further ensure that potential threats are not classified incorrectly. The ability to verify a potential threat ensures that the model detects actual threats more effectively and simplifies the update process.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, model training operations, threat detection operations, zero-trust related operations, model adaptation operations, or the like. More generally, the scope of the invention embraces any operating environment in which the disclosed concepts may be useful.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, containers, or virtual machines (VMs).

Particularly, devices in the operating environment may take the form of software, physical machines, containers, or VMs, or any combination of these, though no particular device implementation or configuration is required for any embodiment. Similarly, data system components such as databases, storage servers, storage volumes (LUNs), storage disks, services, and servers, for example, may likewise take the form of software, physical machines, containers, or virtual machines (VM), though no particular component implementation is required for any embodiment.

It is noted with respect to the disclosed methods that any operation(s) of any of the methods disclosed herein, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Following are some further example embodiments of the invention. These are presented only by way of example and are not intended to limit the scope of the invention in any way.

Embodiment 1. A method comprising: creating a threat detection model configured to classify data into one or more classes including a safe class, marking data that are classified in the safe class below a threshold value as suspect data, analyzing the suspect data at a central server to determine whether the suspect data represent a new threat, generating a new dataset corresponding to the suspect data, and adapting the threat detection model to detect a new class corresponding to the new threat represented in the new dataset.

Embodiment 2. The method of embodiment 1, wherein creating a threat detection model further comprises training the threat detection model to classify data into a safe class and at least one threat class.

Embodiment 3. The method of embodiment 1 and/or 2, further comprising training the threat detection model to detect a set of known threats, each of the threats associated with a different threat class.

Embodiment 4. The method of embodiment 1, 2, and/or 3, wherein adapting the threat detection model comprises performing continual learning to generate an adapted threat detection model such that the threat detection model is configured to detect the new threat without forgetting how to detect previously learned threats.

Embodiment 5. The method of embodiment 1, 2, 3, and/or 4, further comprising deploying the adapted threat detection model to replace the threat detection model operating at an endpoint.

Embodiment 6. The method of embodiment 1, 2, 3, 4, and/or 5, wherein analyzing the suspect data comprises performing automated threat analysis.

Embodiment 7. The method of embodiment 1, 2, 3, 4, 5, and/or 6, further comprising receiving expert input when analyzing the suspect data.

Embodiment 8. The method of embodiment 1, 2, 3, 4, 5, 6, and/or 7, further comprising collecting the data that are below the threshold value and collecting metadata associated with the data that are below the threshold value.

Embodiment 9. The method of embodiment 1, 2, 3, 4, 5, 6, 7, and/or 8, further comprising collecting additional data for the new class when the adapted model does not achieve a specified threshold for detecting the new threat.

Embodiment 10. The method of embodiment 1, 2, 3, 4, 5, 6, 7, 8, and/or 9, wherein the threat detection model comprises a single model that is configured to adapt to new threats and wherein the data comprises files.

Embodiment 11. A system, comprising hardware and/or software, operable to perform any of the operations, methods, or processes, or any portion of any of these, or any combination thereof disclosed herein.

Embodiment 12. A non-transitory storage medium having stored therein instructions that are executable by one or more hardware processors to perform operations comprising the operations of any one or more of embodiments 1-11.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

With reference briefly now to FIG. 5, any one or more of the entities disclosed, or implied, by the Figures, and/or elsewhere herein, may take the form of, or include, or be implemented on, or hosted by, a physical computing device, one example of which is denoted at 500. As well, where any of the aforementioned elements comprise or consist of a virtual machine (VM), that VM may constitute a virtualization of any combination of the physical components disclosed in FIG. 5.

In the example of FIG. 5, the physical computing device 500 includes a memory 502 which may include one, some, or all, of random access memory (RAM), non-volatile memory (NVM) 504 such as NVRAM for example, read-only memory (ROM), and persistent memory, one or more hardware processors 506, non-transitory storage media 508, UI device 510, and data storage 512. One or more of the memory components 502 of the physical computing device 500 may take the form of solid state device (SSD) storage. As well, one or more applications 514 may be provided that comprise instructions executable by one or more hardware processors 506 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
   creating a threat detection model configured to classify data into one or more classes including a safe class;
   deploying the threat detection model to a computing environment;
   evaluating data, by the threat detection model, in the computing environment, wherein the threat detection model generates a classification for the data;
   marking data that are classified in the safe class below a threshold value as suspect data;
   analyzing the suspect data at a central server to determine whether the suspect data represent a new threat;
   generating a new dataset corresponding to the suspect data;
   updating the threat detection model at the central server by training the threat detection model at the central server with the new dataset without causing the threat detection model to forget previous learning; and
   deploying the updated threat detection model to the computing environment, wherein the updated threat detection model is configured to detect a new class corresponding to the new threat represented in the new dataset; and
   evaluating data, by the updated threat detection model, in the computing environment.

2. The method of claim 1, wherein creating a threat detection model further comprises training the threat detection model to classify data into the safe class and at least one threat class.

3. The method of claim 1, further comprising training the threat detection model to detect a set of known threats, each of the threats associated with a different threat class.

4. The method of claim 1, wherein updating the threat detection model comprises performing continual learning to generate the adapted threat detection model such that the adapted threat detection model is configured to detect the new threat without forgetting how to detect previously learned threats.

5. The method of claim 4, wherein the adapted threat detection model replaces the threat detection model operating in the computing environment, the computing environment including an endpoint.

6. The method of claim 1, wherein analyzing the suspect data comprises performing automated threat analysis.

7. The method of claim 5, further comprising receiving expert input when analyzing the suspect data.

8. The method of claim 1, further comprising collecting the data that are below the threshold value and collecting metadata associated with the data that are below the threshold value.

9. The method of claim 1, further comprising collecting additional data for the new class when the adapted threat detection model does not achieve a specified threshold for detecting the new threat.

10. The method of claim 1, wherein the threat detection model comprises a single model that is configured to adapt to new threats and wherein the data comprises files.

11. A non-transitory storage medium having stored therein instructions that are executable by one or more hardware processors to perform operations comprising:
    creating a threat detection model configured to classify data into one or more classes including a safe class;
    deploying the threat detection model to a computing environment;
    evaluating data, by the threat detection model, in the computing environment, wherein the threat detection model generates a classification for the data;
    marking data that are classified in the safe class below a threshold value as suspect data;
    analyzing the suspect data at a central server to determine whether the suspect data represent a new threat;
    generating a new dataset corresponding to the suspect data;
    updating the threat detection model at the central server by training the threat detection model at the central server with the new dataset without causing the threat detection model to forget previous learning; and
    deploying the updated threat detection model to the computing environment, wherein the updated threat detection model is configured to detect a new class corresponding to the new threat represented in the new dataset; and
    evaluating data, by the updated threat detection model, in the computing environment.

12. The non-transitory storage medium of claim 11, wherein creating a threat detection model further comprises training the threat detection model to classify data into the safe class and at least one threat class.

13. The non-transitory storage medium of claim 11, further comprising training the threat detection model to detect a set of known threats, each of the threats associated with a different threat class.

14. The non-transitory storage medium of claim 11, wherein updating the threat detection model comprises performing continual learning to generate the adapted threat detection model such that the adapted threat detection model is configured to detect the new threat without forgetting how to detect previously learned threats.

15. The non-transitory storage medium of claim 14, wherein the adapted threat detection model replaces the threat detection model operating in the computing environment, the computing environment including an endpoint.

16. The non-transitory storage medium of claim 11, wherein analyzing the suspect data comprises performing automated threat analysis.

17. The non-transitory storage medium of claim 15, further comprising receiving expert input when analyzing the suspect data.

18. The non-transitory storage medium of claim 11, further comprising collecting the data that are below the threshold value and collecting metadata associated with the data that are below the threshold value.

19. The non-transitory storage medium of claim 11, further comprising collecting additional data for the new class when the adapted threat detection model does not achieve a specified threshold for detecting the new threat.

20. The non-transitory storage medium of claim 11, wherein the threat detection model comprises a single model that is configured to adapt to new threats and wherein the data comprises files.

* * * * *